(12) United States Patent
Graham et al.

(10) Patent No.: US 12,739,231 B2
(45) Date of Patent: Sep. 15, 2026

(54) EMBEDDED SECURITY HARDWARE PROXY

(71) Applicant: Hewlett-Packard Development Company, L.P., Spring, TX (US)

(72) Inventors: Christoph Graham, Spring, TX (US); Thomas Flynn, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 247 days.

(21) Appl. No.: 18/291,813

(22) PCT Filed: Jul. 30, 2021

(86) PCT No.: PCT/US2021/043831
§ 371 (c)(1),
(2) Date: Jan. 24, 2024

(87) PCT Pub. No.: WO2023/009132
PCT Pub. Date: Feb. 2, 2023

(65) Prior Publication Data
US 2024/0372838 A1 Nov. 7, 2024

(51) Int. Cl.
*H04L 9/40* (2022.01)

(52) U.S. Cl.
CPC ................................ *H04L 63/0281* (2013.01)

(58) Field of Classification Search
None
See application file for complete search history.

(56) References Cited

U.S. PATENT DOCUMENTS 11,764,948 B1 * 9/2023 Rambhia ............... H04L 9/0877 380/277
2005/0289648 A1 12/2005 Grobman et al.
2014/0230073 A1 8/2014 Liang
2014/0344332 A1 11/2014 Giebler
2016/0253664 A1 * 9/2016 Yuan .................. G06Q 20/3226 705/71

FOREIGN PATENT DOCUMENTS

RU 2568282 C2 11/2015
WO 2007/065146 A2 6/2007

* cited by examiner

*Primary Examiner* — Farid Homayounmehr
*Assistant Examiner* — Suman Debnath
(74) *Attorney, Agent, or Firm* — Quarles & Brady LLP

(57) ABSTRACT

A host proxy executable within a virtualized environment hostable by a host computing device for a client device intercepts an embedded security hardware communication request sent by an application executable within the virtualized environment. The host proxy sends the embedded security hardware communication request to a client proxy executable on the client computing device. The client proxy relays the embedded security hardware communication request to embedded security hardware of the client computing device.

15 Claims, 12 Drawing Sheets

104
HOST DEVICE
108
VIRTUALIZED ENVIRONMENT
110
APPLICATION
114
HOST PROXY
112
EMBEDDED SECURITY HARDWARE
106
NETWORK
102
CLIENT DEVICE
116
CLIENT PROXY
118
EMBEDDED SECURITY HARDWARE
100

APPLICATION
110
HOST PROXY
114
CLIENT PROXY
116
EMBEDDED SECURITY HARDWARE
118
202
SEND REQUEST
INTERCEPT REQUEST
204
SEND REQUEST
RECEIVE REQUEST
206
RELAY REQUEST
RECEIVE REQUEST
SEND RESPONSE
INTERCEPT RESPONSE
208
SEND RESPONSE
RECEIVE RESPONSE
210
RELAY RESPONSE
RECEIVE RESPONSE
212
200

104
HOST DEVICE
108
VIRTUALIZED ENVIRONMENT
114
HOST PROXY
302
SOFTWARE STACK
110
APPLICATION
112
EMBEDDED SECURITY HARDWARE
106
NETWORK
102
CLIENT DEVICE
118
EMBEDDED SECURITY HARDWARE
304
SOFTWARE STACK
116
CLIENT PROXY
100

100
HOST DEVICE
104A
108A
VIRTUALIZED ENVIRONMENT
VIRTUAL MACHINE
HOST PROXY
APPLICATION
110A
EMBEDDED SECURITY HARDWARE
112A
110B
VIRTUAL MACHINE MANAGER
404A
402A
114A
402B
114B
HOST DEVICE
104B
108A
402C
110C
112B
110D
404B
114C
402D
114D
NETWORK
106
CLIENT DEVICE
102A
CLIENT PROXY
116A
118A
102B
116B
118B

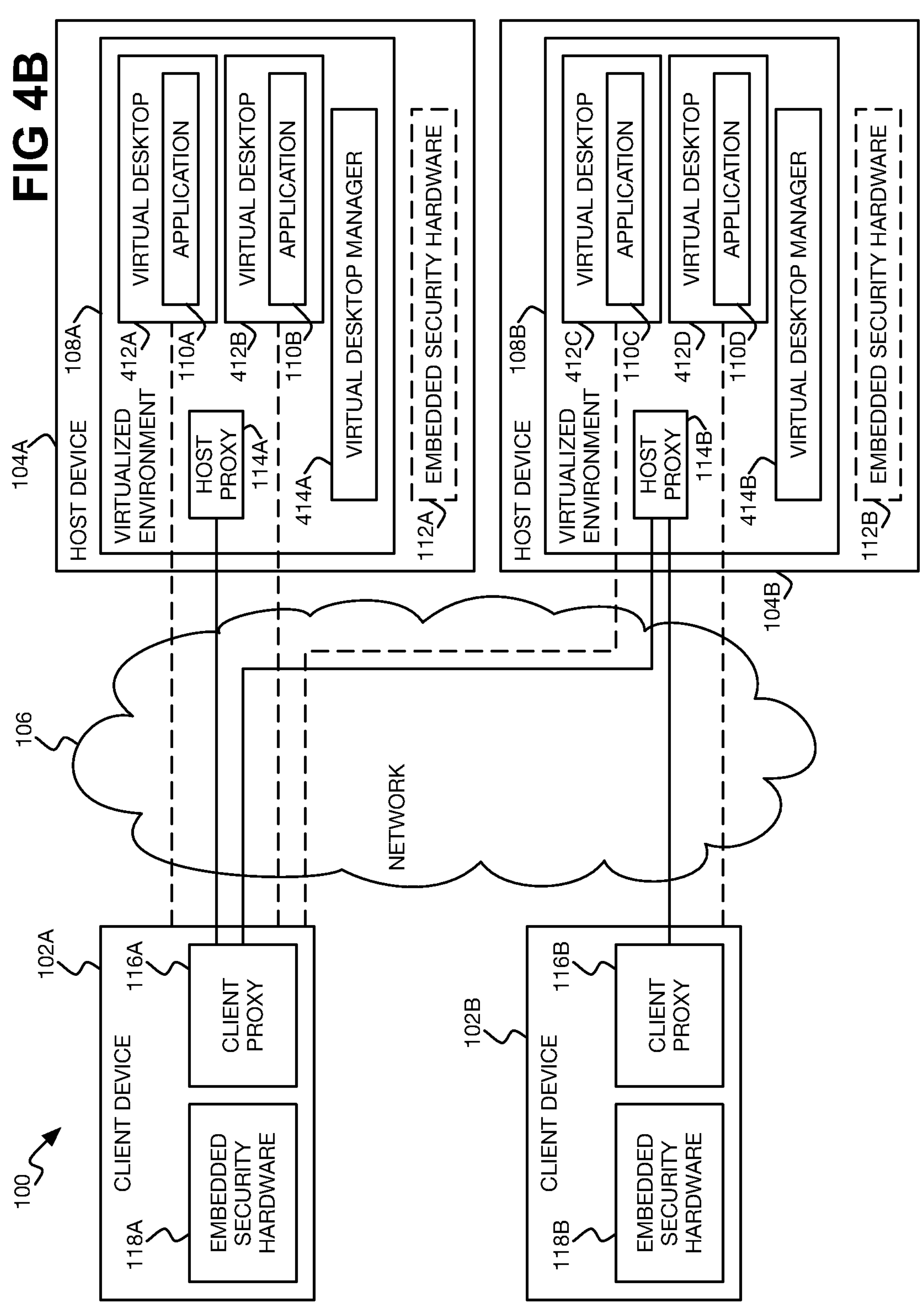
FIG 4B
100
HOST DEVICE
104A
108A
VIRTUALIZED ENVIRONMENT
VIRTUAL DESKTOP
APPLICATION
412A
110A
VIRTUAL DESKTOP
APPLICATION
412B
110B
HOST PROXY
114A
VIRTUAL DESKTOP MANAGER
414A
EMBEDDED SECURITY HARDWARE
112A
HOST DEVICE
104B
108B
VIRTUALIZED ENVIRONMENT
VIRTUAL DESKTOP
APPLICATION
412C
110C
VIRTUAL DESKTOP
APPLICATION
412D
110D
HOST PROXY
114B
VIRTUAL DESKTOP MANAGER
414B
EMBEDDED SECURITY HARDWARE
112B
106
NETWORK
CLIENT DEVICE
102A
CLIENT PROXY
116A
EMBEDDED SECURITY HARDWARE
118A
CLIENT DEVICE
102B
CLIENT PROXY
116B
EMBEDDED SECURITY HARDWARE
118B

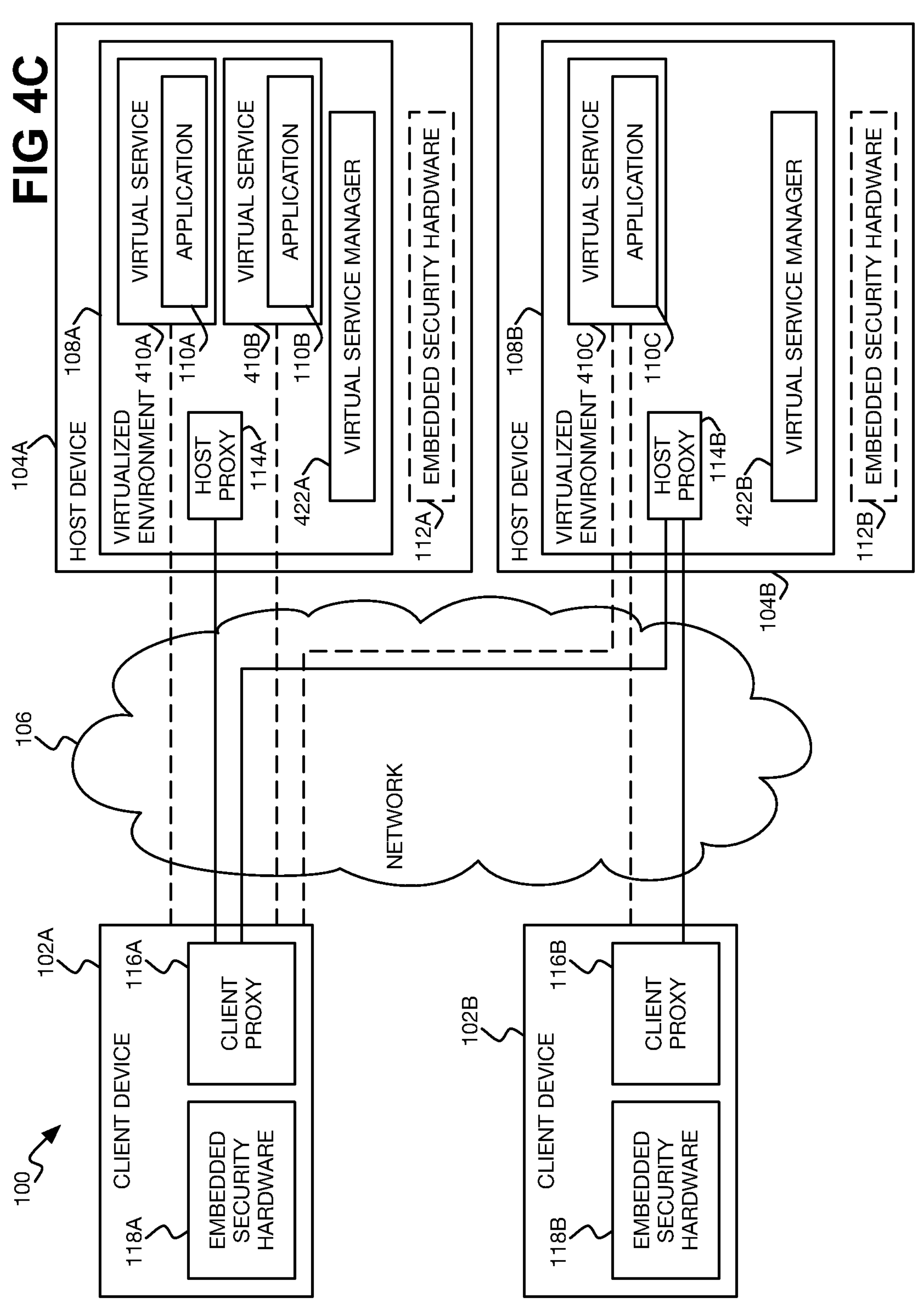
FIG 4C
HOST DEVICE
104A
108A
VIRTUALIZED ENVIRONMENT 410A
VIRTUAL SERVICE
APPLICATION
110A
410B
VIRTUAL SERVICE
APPLICATION
110B
HOST PROXY
114A
422A
VIRTUAL SERVICE MANAGER
112A
EMBEDDED SECURITY HARDWARE
HOST DEVICE
104B
108B
VIRTUALIZED ENVIRONMENT 410C
VIRTUAL SERVICE
APPLICATION
110C
HOST PROXY
114B
422B
VIRTUAL SERVICE MANAGER
112B
EMBEDDED SECURITY HARDWARE
106
NETWORK
100
CLIENT DEVICE
102A
116A
CLIENT PROXY
118A
EMBEDDED SECURITY HARDWARE
CLIENT DEVICE
102B
116B
CLIENT PROXY
118B
EMBEDDED SECURITY HARDWARE HOST DEVICE
EMBEDDED SECURITY HARDWARE
VIRTUALIZED ENVIRONMENT
APPLICATION
HOST PROXY
VIRTUALIZED ENVIRONMENT HOST PROGRAM CODE
VIRTUALIZED ENVIRONMENT SESSION
MAIN COMMUNICATION CHANNEL
NETWORK
CLIENT DEVICE
VIRTUALIZED ENVIRONMENT CLIENT PROGRAM CODE
CLIENT PROXY
EMBEDDED SECURITY HARDWARE
100
102
104
106
108
110
112
114
116
118
502
504
506
508

100
CLIENT DEVICE
102
VIRTUALIZED ENVIRONMENT CLIENT PROGRAM CODE
504
CLIENT PROXY
116
EMBEDDED SECURITY HARDWARE
118
VIRTUALIZED ENVIRONMENT SESSION
506
MAIN COMMUNICATION CHANNEL
508
SIDEBAND COMMUNICATION CHANNEL
510
NETWORK
106
HOST DEVICE
104
VIRTUALIZED ENVIRONMENT HOST PROGRAM CODE
502
EMBEDDED SECURITY HARDWARE
112
VIRTUALIZED ENVIRONMENT
108
HOST PROXY
114
APPLICATION
110

100
CLIENT DEVICE
102
VIRTUALIZED ENVIRONMENT CLIENT PROGRAM CODE
504
CLIENT PROXY
116
EMBEDDED SECURITY HARDWARE
118
VIRTUALIZED ENVIRONMENT SESSION
506
MAIN COMMUNICATION CHANNEL
508
OUT-OF-BAND COMMUNICATION CHANNEL
512
NETWORK
106
HOST DEVICE
104
VIRTUALIZED ENVIRONMENT HOST PROGRAM CODE
502
EMBEDDED SECURITY HARDWARE
112
VIRTUALIZED ENVIRONMENT
108
HOST PROXY
114
APPLICATION
110

EMBEDDED SECURITY HARDWARE PROXY

BACKGROUND

Modern computing devices, including computers like desktop, laptop, and notebook computers, smartphones, tablet computing devices, and Internet of things (IoT) devices, as well as other types of computing devices, often include embedded security hardware. Embedded security hardware can be a separate integrated circuit (IC) on a mainboard of a computing device, or integrated within another integrated circuit, such as a central processor unit (CPU), of a computing device. Embedded security hardware provides different security-enhancement capabilities.

For example, digital credentials, such as passwords, may be able to be stored in a hardware-based vault of the embedded security hardware, or protected by the embedded security hardware. Cryptographic keys, including encryption, digital signature, and authentication keys, may be managed with embedded security hardware. Individual files and folders, as well as complete storage volumes, can be encrypted using embedded security hardware. State information can be established by embedded security hardware to enable endpoint integrity. Embedded security hardware can augment smartcards, fingerprint readers, fobs, and so on, to provide multifactor (e.g., two-factor) authentication as well.

BRIEF DESCRIPTION OF THE DRAWINGS

FIGS. 4A, 4B, and 4C are diagrams of the example proxy architecture of FIG. 1 for different types of virtualized environments.

DETAILED DESCRIPTION

Figure 1:
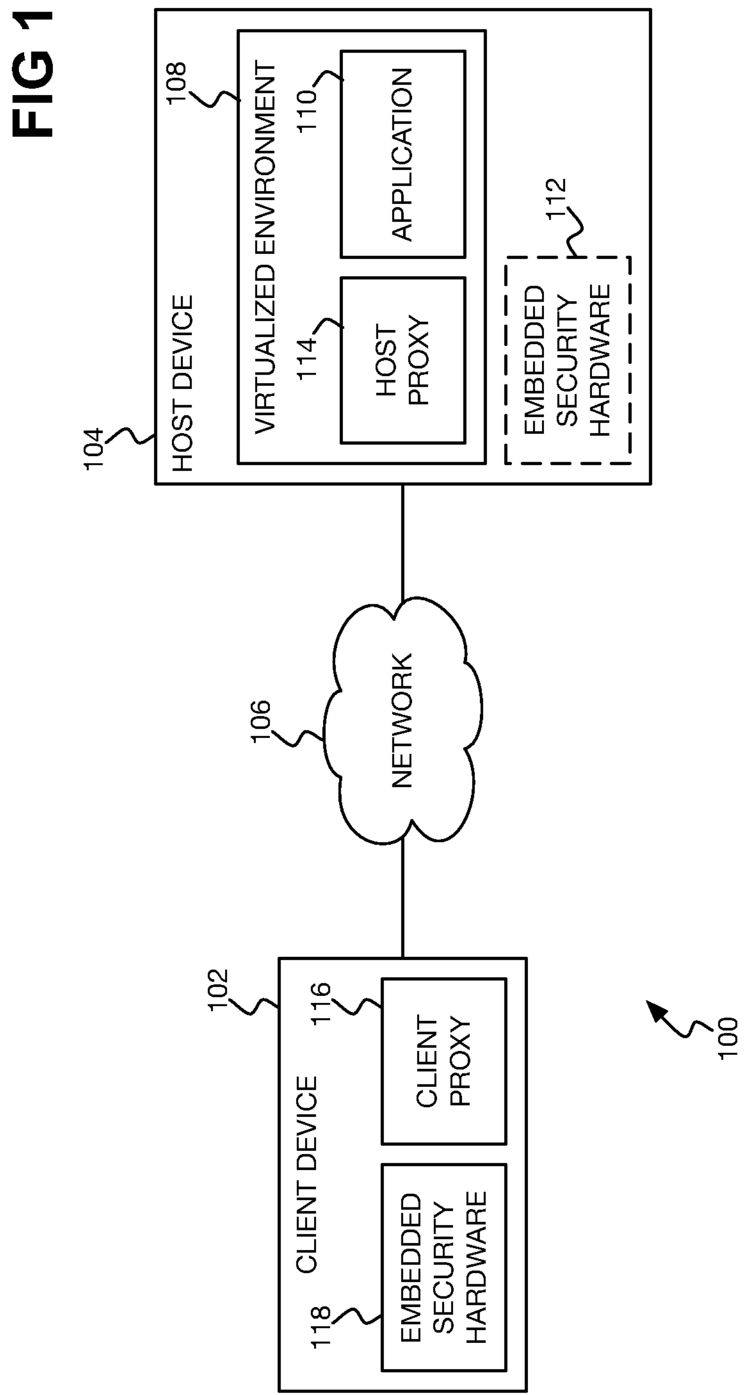
FIG. 1 is a diagram of an example proxy architecture for leveraging embedded security hardware of a client computing device within a virtualized environment hosted by a host computing device.

As noted in the background, a computing device can include embedded security hardware having security-enhancement capabilities. As one example, traditionally user authentication has been controlled by a username-password technique. A user has to enter his or her username and password in order to be authenticated and permitted to access a given resource. However, password-based authentication has proven insecure, in that passwords can often be guessed and/or are often compromised.

Therefore, more recently multifactor authentication, such as two-factor authentication, has increasingly been used. In multifactor authentication, something the user knows—e.g., a username and password combination—is supplemented with something the user has. A user may have to connect a smartcard, fob, or dongle to his or her computing device, for instance. As another example, a one-time password or passphrase made up of one or multiple characters, including alphanumeric characters, may be sent to a different device that the user has, such as a smartphone, and then entered at the user's computing device. For authentication to succeed, both factors—something the user knows and something the user has—have to be shown.

In this context, embedded security hardware of a computing device can act as something the user knows. Examples of such embedded security hardware include a Trusted Platform Module (TPM) chip certified by the Trusted Computing Group and a T1 or T2 security chip designed by Apple, Inc., for instance. Another example of such embedded security hardware includes firmware TPM as well, which is a TPM logically embedded within another processing unit such as an accelerated processing unit (APU). Examples of the latter include Trusted Execution Technology (TXT) available from Intel Corp., and the Platform Security Processor (PSP) available from Advanced Micro Devices, Inc.

Whereas a smartcard, fob, or dongle may not be on the user's person when using his or her computing device—or may be misplaced, lost, or stolen—the user's computing device is by definition available when the user is using the computing device and therefore its embedded security hardware may be more convenient to use for multifactor authentication. Whereas a one-time password or code sent to a different device means the user has to manually enter the code on the computing device, no such code has to be entered when the computing device's embedded security hardware is used for multifactor authentication.

However, users often use their computing devices to access virtualized environments hosted by host computing devices. For example, a user may use his or her computing device to access a virtual machine or a virtual desktop hosted by a host computing device managed by the user's employer or other organization, such as a third party offering such virtualized environments as a service to customers. A virtualized environment does not run on the user's computing device, but rather runs on (i.e., is executed by) the host computing device. This means that the security-enhanced capabilities provided by the embedded security hardware of the user's computing device cannot be used within the virtual machine, virtual desktop, or other virtualized environment that the user is accessing on a host computing device using the computing device.

In light of this, some virtualized environment providers virtualize embedded security hardware as part of the virtualized environments accessible to users. For example, a virtual machine may include virtual embedded security hardware that emulates or mimics actual physical embedded security hardware of a computing device. That is, instead of there being actual embedded security hardware within the computing device, the virtual machine running on (i.e., being executed by) the computing device may virtualize the hardware in software. There is thus no actual embedded security hardware within the device, and instead the virtual machine mimics the hardware completely in software. When a user accesses such a virtual machine hosted by a host computing device, the virtual embedded security hardware can be employed for multifactor authentication and other purposes, in lieu of the embedded security hardware of the computing device that the user is using to access the virtual machine.

However, virtualizing embedded security hardware effectively obviates the inherent security of actual physical embedded security hardware of a computing device. Embedded security hardware of a computing device cannot be used without access to the computing device and cannot be duplicated or removed for utilization in a different computing device. So long as the user retains physical control of his or her computing device, the user can basically be assured that the embedded security hardware is not compromised and is not being used without the user's knowledge.

Virtual embedded security hardware, by comparison, does not have these safeguards. Someone who is able to access the virtual machine or other virtualized environment as hosted for the user by a host computing device is likely able to use the virtual embedded security hardware provided by that virtual machine. A nefarious party may be able to copy the virtual embedded security hardware-since it is in effect just program code (e.g., instructions executable by a processor or other processing resource)—and use the virtual embedded security hardware in contexts other than the virtual machine. The user may not be aware the virtual embedded security hardware has been compromised, even if the user is still able to use the virtual embedded security hardware him or herself when accessing the virtual machine.

Techniques described herein, by comparison, leverage a computing device's embedded security hardware within a virtualized environment hosted by a host computing device, when the virtualized environment is accessed using the computing device. Therefore, a user of the computing device can use the security-enhanced capabilities of the computing device's embedded security hardware even when the user is accessing virtualized environments hosted by host computing devices. The described techniques do not virtualize embedded security hardware, and therefore still retain the intrinsic security provided by actual physical embedded security hardware, in contradistinction to virtual embedded security hardware that emulate or mimic such actual physical hardware.

FIG. 1 shows an example proxy architecture 100 for leveraging the embedded security hardware of a client computing device within a virtualized environment hosted by a host computing device. The proxy architecture 100 includes a client computing device 102 and a host computing device 104 that are communicatively connected to one another over a network 106. The architecture 100 is the computing system topology that provides for proxy functionality between the embedded security hardware of the client computing device 102 and the virtualized environment of the host computing device 104. The network 106 may be or include the Internet, an intranet, an extranet, a wide-area network (WAN), a local-area network (LAN), a mobile telephony network, a wired network, and/or a wireless network, among other types of networks.

The host computing device 104 hosts a virtualized environment 108 for the client computing device 102. For instance, the client computing device 102 may be a computing device of a user, such as a desktop, laptop, or notebook computer, a smartphone, a tablet computing device, or another type of computing device. The virtualized environment 108 may thus be a virtualized environment for the user of the client computing device 102 in this respect. The user uses the client computing device 102 to access the virtualized environment 108 hosted at the host computing device 104.

The virtualized environment 108 is an environment for the client computing device 102 (e.g., for the user of the client computing device 102) that is virtualized in that the client computing device 102 does not provide the environment 108. Rather, the host computing device 104 provides the virtualized environment 108. Therefore, the environment 108 is virtualized at least in the sense that the client computing device 102 can interact with the environment 108 as if the environment 108 were provided by the client computing device 102, even though in actuality the environment is provided by the host computing device 104 and accessed at the client computing device 102.

The host computing device 104 may be a server computing device that is provided by or for an entity. Such an entity may be the user's employer or other organization with which the user is affiliated. The entity may be a third party providing the virtualized environment 108 for the user of the client computing device 102 as a service. The virtualized environment 108 may include a virtual machine or virtual desktop assigned to or associated with the user of the client computing device 102, for instance.

The client computing device 102 may instead not be associated with an individual user per se, but rather an Internet of things (IoT) device, such as a sensor. In this case, the virtualized environment 108 may include a virtual service that collects sensor readings from the client computing device 102. The host computing device 104 may be a server computing device provided by or for an entity that also manages or owns the client computing device 102, or that provides the virtualized environment 108 for another party that controls the client computing device 102.

The virtualized environment 108 can include an application 110. The application 110 is program code running on the host computing device 104 within the virtualized environment 108. The terminology "application" is used broadly. For example, the application 110 may be a standalone computer program or service running in the context of an operating system of the virtualized environment 108, may be a part of the operating system itself, or may be a different type of application running within the virtualized environment 108.

While just one application 110 is depicted within the virtualized environment 108, there is likely to be more than one such application 110 running within the virtualized environment 108. The host computing device 104 may host more than one virtualized environment 108, which may be for the same client computing device 102 (i.e., the same user) or for different client computing device 102 (i.e., different users). Therefore, there may be more than one client computing device 102. There likewise may be more than one host computing device 104 providing virtualized environments 108, where a given client computing device 102 may be associated with one or multiple virtualized environments 108 hosted by one or multiple host computing devices 104.

The host computing device 104 may include or may lack embedded security hardware 112, which is why the embedded security hardware 112 is denoted by dashed lines in the figure. By comparison, the client computing device 102 does include embedded security hardware 118. The embedded security hardware 118 of the client computing device 102 is leveraged within the virtualized environment 108 hosted by the host computing device 104 via a host proxy 114 running within the virtualized environment 108 hosted on the host computing device 104 and a client proxy 116 running on the client computing device 102.

The host and client proxies 114 and 116 interact in such a way so that the embedded security hardware 118 can be used within the virtualized environment 108, including in lieu of any embedded security hardware 112 of the host computing device 104. That is, the proxies 114 and 116 permit the embedded security hardware 118 to be used as if the hardware 118 were part of the host computing device 104 or as if the virtualized environment 108 were running on the client computing device 102. The proxies 114 and 116 therefore provide the proxy functionality of the proxy architecture 100. The proxies 114 and 116 interact as an intermediary between the embedded security hardware 118 and the virtualized environment 108, where the proxy 114 intermediates at the virtualized environment 108 and the proxy 116 intermediates at the embedded security hardware 118.

Figure 2:
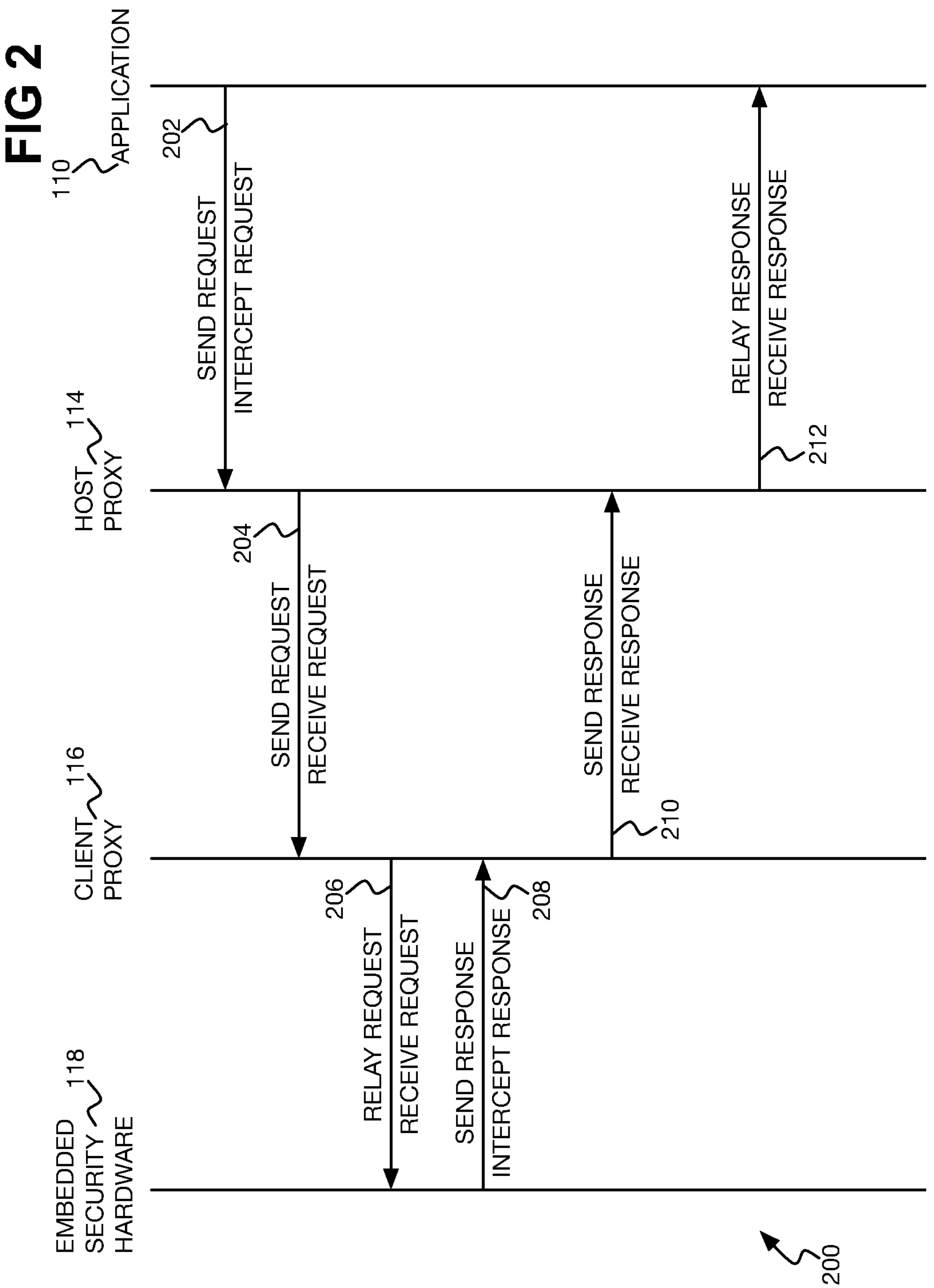
FIG. 2 is a diagram of an example process for leveraging embedded security hardware of a client computing device within a virtualized environment hosted by a host computing device using the proxy architecture of FIG. 1.

FIG. 2 shows an example process 200 by which the host proxy 114 and the client proxy 116 can permit usage of the embedded security hardware 112 of the client computing device 102 within the virtualized environment 108 hosted by the host computing device 104. In the figure, text above an arrow is associated with the source of the arrow, and text below an arrow is associated with the destination of the arrow. For example, the arrow 202 extends from the application 110 to the host proxy 114. The text "send request" above arrow 202 therefore means that the application 110 sends a request, and the text "intercept request" below the arrow 202 means that the host proxy 114 intercepts the request.

Per the arrow 202, then, the application 110 within the virtualized environment 108 thus sends an embedded security hardware request. The embedded security hardware request is nominally intended for the embedded security hardware 112 of the host computing device 104, which the host computing device 104 may in actuality lack. The embedded security hardware request is nominally intended for such (present or absent) embedded security hardware 112 because the application 110 is running on the host computing device 104, albeit within the virtualized environment 108 for the client computing device 102. Such requests, in other words, are nominally expected to be processed by embedded security hardware 112 of the computing device 104 on which the application 110 is actually running (i.e., the computing device 104 that is actually executing the application 110).

Per the arrow 202, the host proxy 114 within the virtualized environment 108 intercepts the embedded security hardware request. If the host proxy 114 were not to intercept the embedded security hardware request, the request may instead be sent to the embedded security hardware 112 of the host computing device 104, if present. If the host computing device 104 lacks embedded security hardware 112, an error may instead result since there is no actual embedded security hardware 112 to process the request, or virtual embedded security hardware of the virtualized environment 108 may process the request.

Per the arrow 204, the host proxy 114 sends the intercepted embedded security hardware request over the network 106 to the client proxy 116 running on the client computing device 102, which thus receives the request. Per the arrow 206, the client proxy 116 in turn relays the embedded security hardware request to the embedded security hardware 118 of the client computing device 102 itself, with the embedded security hardware 118 thus receiving the request. The embedded security hardware 118 therefore processes the request as if the embedded security hardware request originated within the client computing device 102, whereas in actuality the request originated within the host computing device 104 by the application running 110 running within the virtualized environment 108.

Per the arrow 208, the embedded security hardware 118 may subsequently send an embedded security hardware response in reply to the request. The response is intended for the application 110 running within the virtualized environment 108 hosted by the host computing device 104, since the application 110 originated the request. However, the embedded security hardware 118 can be unaware that the application 110 is not running on the client computing device 102 itself, since the hardware 118 received the request from the client proxy 116 that is running on the client computing device 102. The embedded security hardware 118 may be unaware of the proxying provided by the host proxy 114 and the client proxy 116.

Per the arrow 208, the client proxy 116 intercepts the embedded security hardware response. If the client proxy 116 were not to intercept the response, an error may result, since the application 110 for which the embedded security hardware response is intended is not actually running on the client computing device 102. Per the arrow 210, the client proxy 116 sends the embedded security hardware response over the network 106 to the host proxy 114 running within the virtualized environment 108 hosted by the host computing device 104, which thus receives the request. Per the arrow 212, the host proxy 114 in turn relays the embedded security hardware response to the application 110, which thus receives the request.

In this way, the embedded security hardware 118 of the client computing device 102 is leveraged for usage within the virtualized environment 108 hosted by the host computing device 104 for the client computing device 102 as if the embedded security hardware 118 were part of the host computing device 104. For example, the application 110 may send a multifactor authentication request so that authentication can be provided on the basis of the embedded security hardware 118 of the client computing device 102. If the application 110 were running on the client computing device 102, the embedded security hardware 118 would receive the request and return a corresponding multifactor authentication response. The described proxy architecture 100 permits such usage of the multifactor authentication functionality of the embedded security hardware 118 even though the application 110 is running on the host computing device 104.

Other types of embedded security hardware requests that the application 110 may send can include data that is to be encrypted by embedded security hardware (and which is ultimately encrypted by the hardware 118). Therefore, the embedded security hardware responses may include the encrypted data. The requests may include requests for authentication information, such as passwords, stored on embedded security hardware (and thus which may be stored on the hardware 118), such that the responses include the request information. The requests may include such authentication information to be stored on embedded security hardware (and thus on the hardware 118), with the responses correspondingly including confirmation of such storage. In general, the embedded security hardware requests can include requests pertaining to the functionality of embedded security hardware, and which are ultimately provided by the embedded security hardware 118, with the hardware 118 returning corresponding responses.

Figure 3:
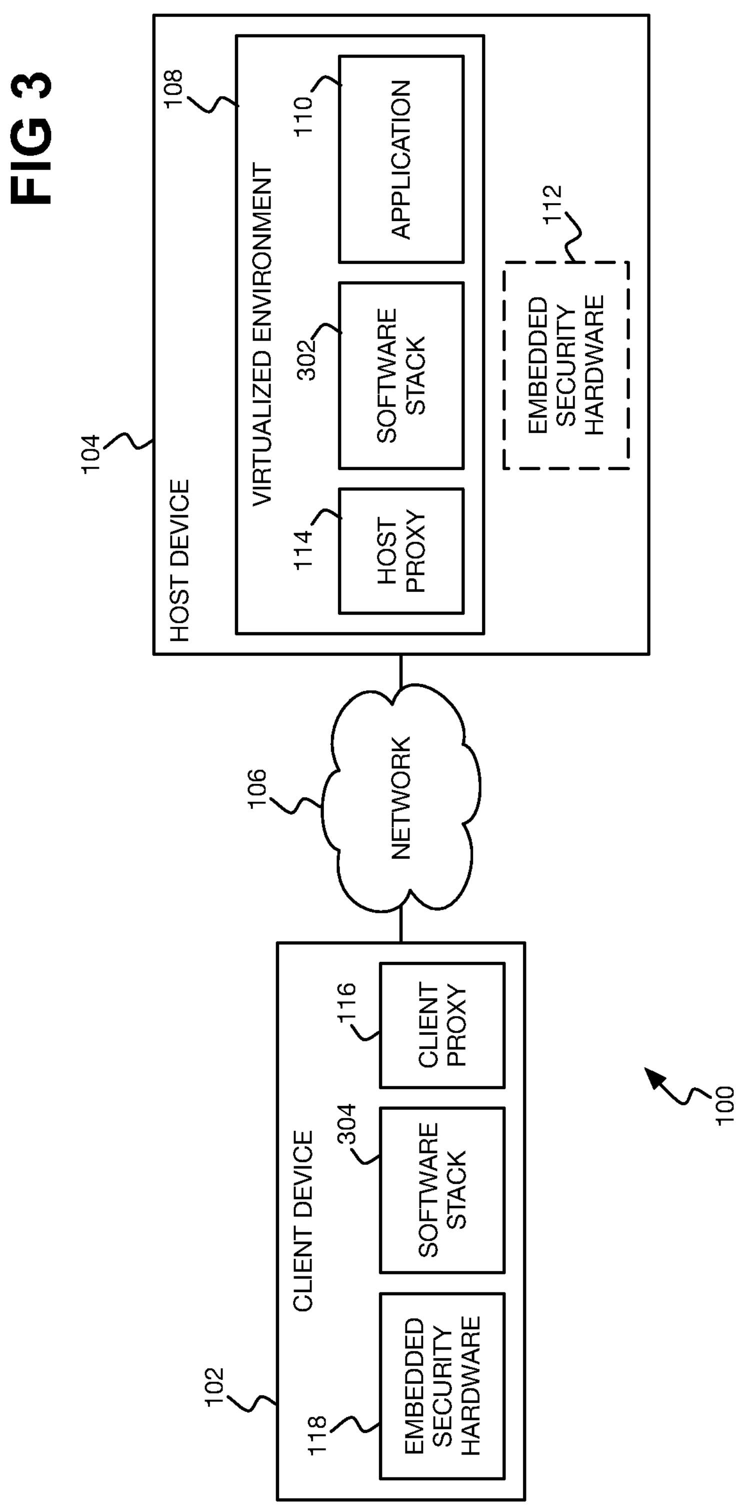
FIG. 3 is a diagram of the example proxy architecture of FIG. 1 in which embedded security hardware is accessible via a software stack.

FIG. 3 shows the example proxy architecture 100 in an implementation in which embedded security hardware is accessible via a software stack. For example, a TPM chip is accessed via a TPM software stack (TSS) that defines the application programming interface (API) by which such embedded security hardware is sent requests and from which such embedded security hardware provides responses. FIG. 3 therefore shows how the example proxy architecture 100 can be implemented where the embedded security hardware is accessed using such a software stack.

In the example, the host computing device 104 includes a host embedded security hardware software stack 302 that runs within the virtualized environment 108 hosted by the host computing device 104. The software stack 302 is specifically positioned above the host proxy 114 and below the application 110. The application 110 sends embedded security hardware requests to embedded security hardware 112 (that the host computing device 104 may in actuality lack) via the software stack 302, and the host proxy 114 intercepts the requests before they reach any such embedded security hardware 112. Even if the host computing device 104 lacks the embedded security hardware 112, the virtualized environment 108 still includes the software stack 302 so that the application 110 can make embedded security hardware requests and receive corresponding responses. The host proxy 114 thus intercepts the requests at the software stack 302 and relays responses through the software stack 302.

The client computing device 102 similarly includes a client embedded security hardware software stack 304 that is positioned below the client proxy 116 and above the embedded security hardware 118 of the client computing device 102. The embedded security hardware 118 sends embedded security hardware responses through the software stack 304, with the client proxy 116 intercepting the responses at the software stack 304 for relaying to the host proxy 114 to provide to the application 110 via the software stack 302 within the virtualized environment 108. The client proxy 116 relays embedded security hardware requests received from the host proxy 114 through the software stack 304 to the embedded security hardware 118.

Figure 4A:
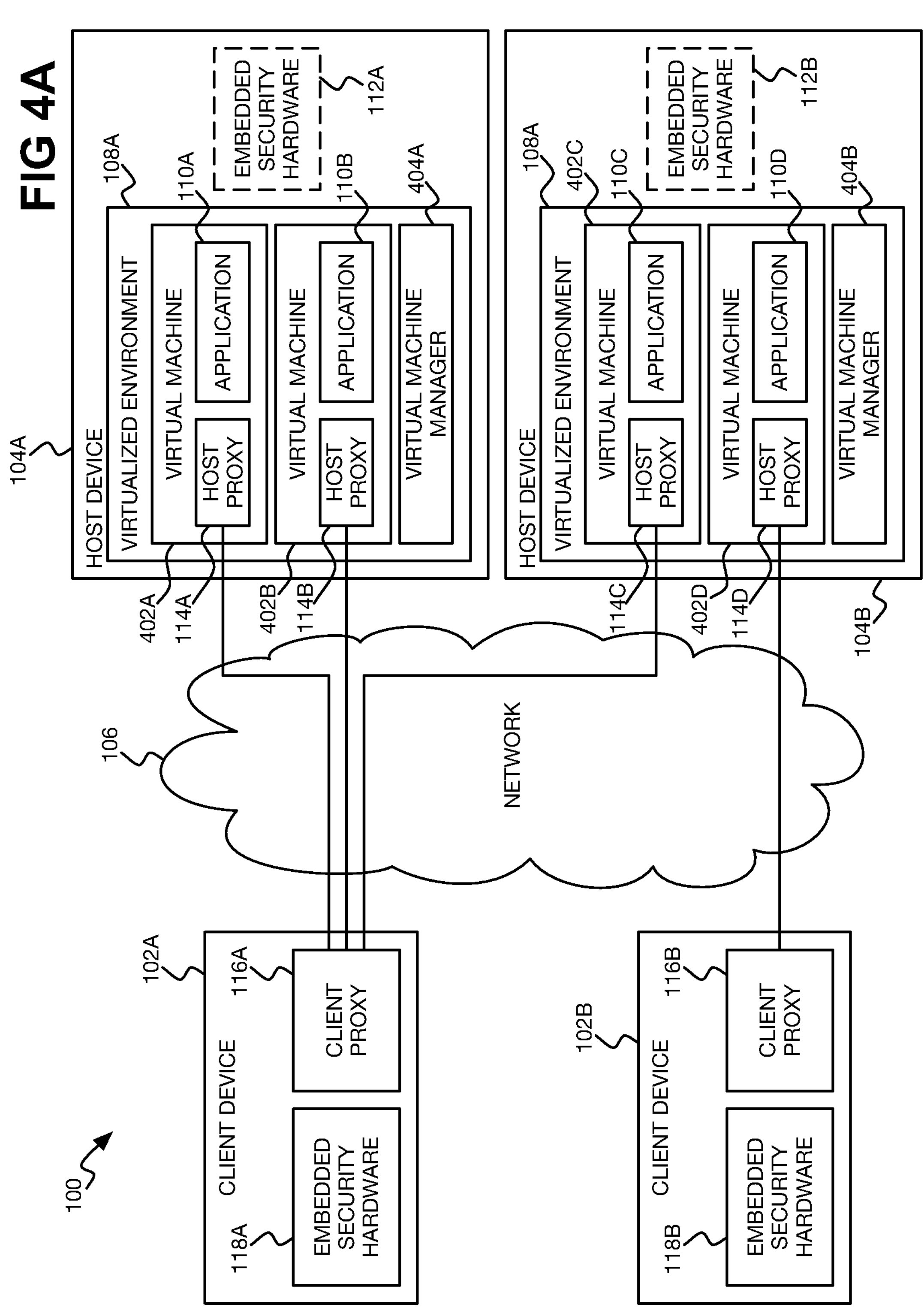

FIGS. 4A, 4B, and 4C show the example proxy architecture 100 for different types of virtualized environments 108. In these figures, two client computing devices 102A and 102B are depicted for example purposes, as are two host computing devices 104A and 104B. The host computing devices 104A and 104B have respective virtualized environments 108A and 108B, and may or may not have respective embedded security hardware 112A and 112B. The client computing devices 102A and 102B have respective client proxies 116A and 116B, and respective embedded security hardware 118A and 118B.

In FIG. 4A, the virtualized environments 108A and 108B include virtual machines, but may instead include virtual desktops. A virtual machine is the virtualization of an entire computing device or machine, and thus operates as if it were a computing device. By comparison, a virtual desktop, as may be provided by virtualization desktop infrastructure (VDI), is the virtualization of just the desktop of such a computing device, including the operating system and applications accessible on such a desktop, and not the computing device or machine in its entirety.

Specifically, the virtualized environment 108A hosted by the host computing device 104A includes virtual machines 402A and 402B that are both associated with the client computing device 102A, and thus for the user of the client computing device 102A. The virtualized environment 108B hosted by the host computing device 104B includes virtual machines 402C and 402D that are respectively associated with and thus for the users of the client computing devices 102A and 102B.

The virtual machines 402A and 402B may be managed by a virtual machine manager 404A of the virtualized environment 108A, and the virtual machines 402C and 402D may similarly be managed by a virtual machine manager 404B of the virtualized environment 108B. The virtual machine managers 404A and 404B and may also be referred to as hypervisors. The virtual machines 402A, 402B, 402C, and 402D include respective applications 110A, 110B, 110C, and 110D, and in the example include respective host proxies 114A, 114B, 114C, and 114D.

The client proxy 116A therefore can interact with each of the host proxies 114A, 114B, and 114C to permit the embedded security hardware 118A of the client computing device 102A to be used within the virtual machines 402A, 402B, and 402C, respectively. The client proxy 116A may seamlessly permit concurrent usage of the embedded security hardware 118A within these virtual machines 402A, 402B, and 402C. The client proxy 116B similarly can interact with the host proxy 114D to permit the embedded security hardware 118B of the client computing device 102B to be used within the virtual machine 402D.

FIG. 4A shows that the embedded security hardware 118A of a client computing device 102A can be used within multiple virtual machines 402A and 402B hosted at the same computing device 104A and can be used within multiple virtual machines 402A, 402B, and 402C hosted at different computing devices 104A and 104B. FIG. 4A shows that a host computing device 104A may host multiple virtual machines 402A and 402B in which the embedded security hardware 118A of a client computing device 102A can be used. FIG. 4A further shows that a host computing device 104B may host multiple virtual machines 402C and 402D in which the embedded security hardware 118A and 118B of different client computing devices 102A and 102B can respectively be used.

In FIG. 4B, the virtualized environments 108A and 108B include virtual desktops as may be provided by VDI, but in another implementation may instead include virtual machines. Specifically, the virtualized environment 108A hosted by the host computing device 104A includes virtual desktops 412A and 412B that are both associated with the client computing device 102A, and thus for the user of the client computing device 102A. The virtualized environment 108B hosted by the host computing device 104B includes virtual desktops 412C and 412D that are respectively associated with and thus for the users of the client computing devices 102A and 102B.

The virtual desktops 412A and 412B may be managed by a virtual desktop manager 414A of the virtualized environment 108A provided by the VDI of the host computing device 104A, and the virtual desktops 412C and 412D may similarly be managed by a virtual desktop manager 414B of the virtualized environment 108B provided by the VDI of the host computing device 104B. The virtual desktops 412A, 412B, 412C, and 412D include respective applications 110A, 110B, 110C, and 110D.

In the example, the virtualized environment 108A has a host proxy 114A that handles embedded security hardware communication requests and responses for both virtual desktops 412A and 412B of the virtualized environment 108A. Similarly, the virtualized environment 108B has a host proxy

114B that handles embedded security hardware communication requests and responses for both virtual desktops 412C and 412D of the virtualized environment 108B. The example of FIG. 4B differs in this respect from the example of FIG. 4A, in which each virtual machine 402A, 402B, 402C, and 402D has its own corresponding host proxy 114A, 114B, 114C, and 114D, respectively.

The client proxy 116A can interact with the host proxy 114A to permit the embedded security hardware 118A of the client computing device 102A to be used within the virtual desktops 412A and 412B, and with the host proxy 114B to permit the embedded security hardware 118A to be used within the virtual desktop 412C. The client proxy 116A may seamlessly permit concurrent usage of the embedded security hardware 118A within these virtual desktops 412A, 412B, and 412C. The client proxy 116B can also interact with the host proxy 114B to permit the embedded security hardware 118B of the client computing device 102B to be used within the virtual desktop 412D.

FIG. 4B shows that the embedded security hardware 118A of a client computing device 102A can be used within multiple virtual desktops 412A and 412B hosted at the same computing device 104A and can be used within multiple virtual desktops 412A, 412B, and 412C hosted at different computing devices 104A and 104B. FIG. 4B shows that a host computing device 104A may host multiple virtual desktops 412A and 412B in which the embedded security hardware 118A of a client computing device 102A can be used. FIG. 4B further shows that a host computing device 104B may host multiple virtual desktops 412C and 412D in which the embedded security hardware 118A and 118B of different client computing devices 102A and 102B can respectively be used.

In FIG. 4C, the virtualized environments 108 include virtual services, as may be used when the client computing devices 102 are IoT devices that do not have respective users per se. Rather, the IoT devices may be deployed sensors, for instance, that report their sensor readings to virtual services. The virtual services may be provided by computer programs that are responsible just for the collection of sensors readings or other types of data from IoT devices, therefore.

The virtual services may instead be virtualized applications, which are similar to virtual services but are considered complete application programs instead of just services. Services can be considered as executed program code that provides functionality to other programs running within the virtualized environments 108, or to the users of those programs (as accessed at the client computing devices 102). For example, rather than a computer program performing certain functionality itself, the program can access a service that provides this functionality. A given service therefore can provide functionality to multiple programs.

The virtualized environment 108A hosted by the host computing device 104A specifically includes virtual services 410A and 410B associated with and thus for the client computing device 102A. The virtualized environment 108B hosted by the host computing device 104B includes a virtual service 410C that is for both client computing devices 102A and 102B, by comparison. The virtual services 410A and 410B may be managed by a virtual service manager 422A of the virtualized environment 108A hosted by the host computing device 104A. The virtual service 410C may be similarly managed by a virtual service manager 422B of the virtualized environment 108B hosted by the computing device 104B.

The virtual services 410A, 410B, and 410C can be considered as including respective applications 110A, 110B, and 110C. The applications 110A, 110B, and 110C can specifically be the program code that is executed to implement the virtual services 410A, 410B, and 410C, respectively. That is, in one implementation, each application 110A, 110B, and 110C can be considered as providing its respective virtual service 410A, 410B, and 410C.

In the example, the virtualized environment 108A has a host proxy 114A that handles embedded security hardware communication requests and responses for both virtual services 410A and 410B of the virtualized environment 108A. Similarly, the virtualized environment 108B has a host proxy 114B that handles embedded security hardware communication requests and responses for the virtual service 410C of the virtualized environment 108B.

The client proxy 116A can therefore interact with the host proxy 114A to permit the embedded security hardware 118A of the client computing device 102A to be used with the virtual services 410A and 410B, and with the host proxy 114B to permit the embedded security hardware 118A to be used with the virtual service 410C. The client proxy 116A may seamlessly permit concurrent usage of the embedded security hardware 118A with these virtual services 410A, 410B, and 410C. The client proxy 116B can interact with the host proxy 114B to permit the embedded security hardware 118B of the client computing device 102B to also be used with the virtual service 410C. The virtual service 410C can thus concurrently use the embedded security hardware 118A and 118B of both the client computing devices 102A and 102B, depending on the client computing device 102A or 102B with which the virtual service 410C is currently communicating.

FIG. 4C shows that the embedded security hardware 118A of a client computing device 102A can be used with multiple virtual services 410A and 410B hosted at the same computing device 104A and can be used with multiple virtual services 410A, 410B, and 410C hosted at different computing devices 104A and 104B. FIG. 4C shows that a host computing device 104A may host multiple virtual services 410A and 410B with which the embedded security hardware 118A of a client computing device 102A can be used. FIG. 4C further shows that a host computing device 104B may host a virtual service 410C with which the embedded security hardware 118A and 118B of different client computing devices 102A and 102B can respectively be used.

In FIGS. 4A, 4B, and 4C, the client computing device 102A may be considered as a first computing device. The host computing device 104A may be considered as both a first host computing device and a second host computing device; that is, the first and second host computing devices are the same host computing device 104A. In this case, the virtual machine 402A of FIG. 4A, the virtual desktop 412A of FIG. 4B, or the virtual service 410A of FIG. 4C may be or be part of a first virtualized environment, and the virtual machine 402B of FIG. 4A, the virtual desktop 412B of FIG. 4B, or the virtual service 410B of FIG. 4C may be or be part of a second virtualized environment.

Instead, however, the host computing device 104A may be considered a first host computing device and the host computing device 104B may be considered a second host computing device; that is, the first and second host computing devise are different host computing devices 104A and 104B. In this case, the virtual machine 402A or 402B of FIG. 4A, the virtual desktop 412A or 412B of FIG. 4B, or the virtual service 410A or 410B of FIG. 4C may be or be part of a first virtualized environment. The virtual machine 402C of FIG. 4A, the virtual desktop 412C of FIG. 4B, or the virtual service 410C of FIG. 4C may be or be part of a second virtualized environment.

Figure 5A:
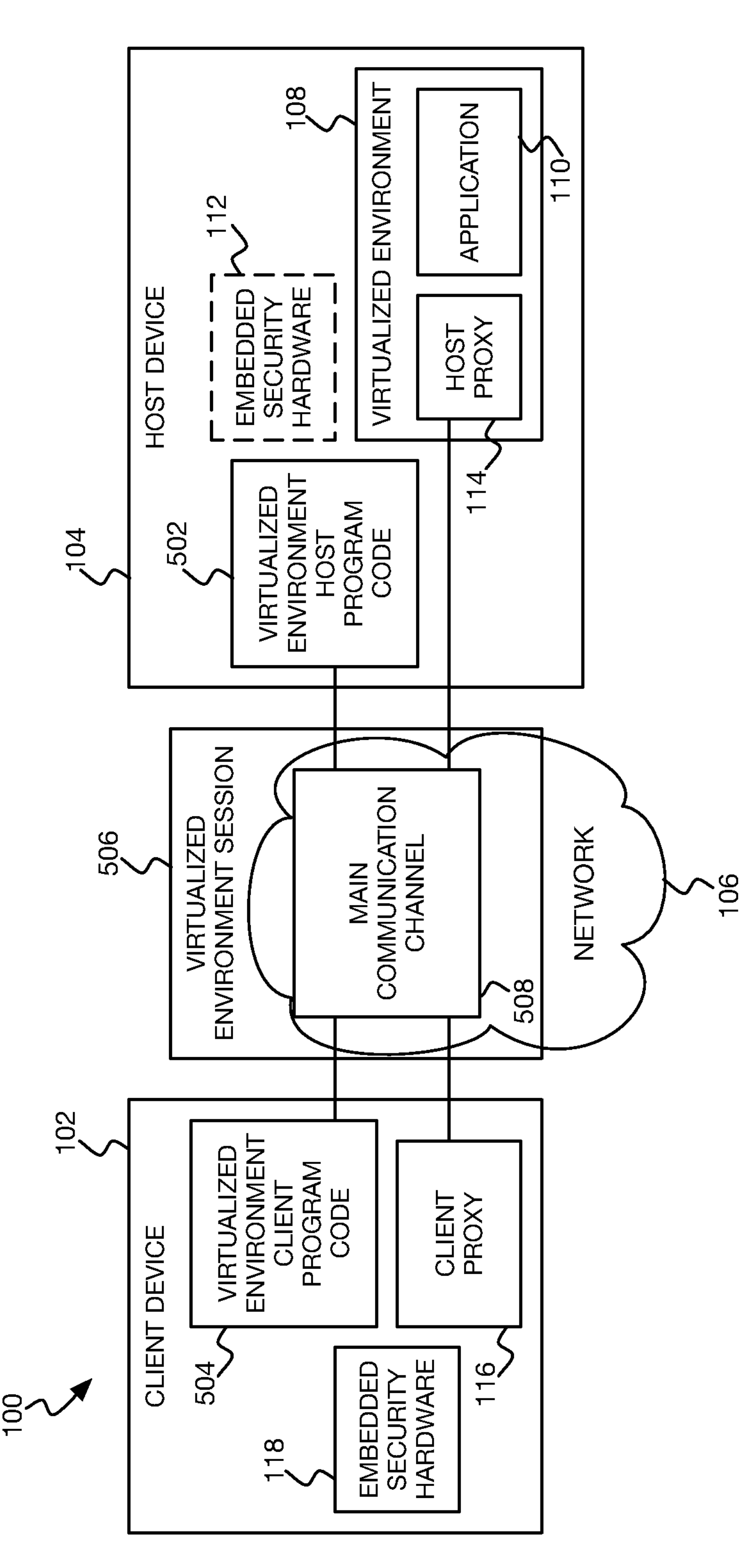
FIGS. 5A, 5B, and 5C are diagrams of the example proxy architecture of FIG. 1 in which different types of communication channels are used for leveraging embedded security hardware of a client computing device within a virtualized environment hosted by a host computing device.
Figure 5B:
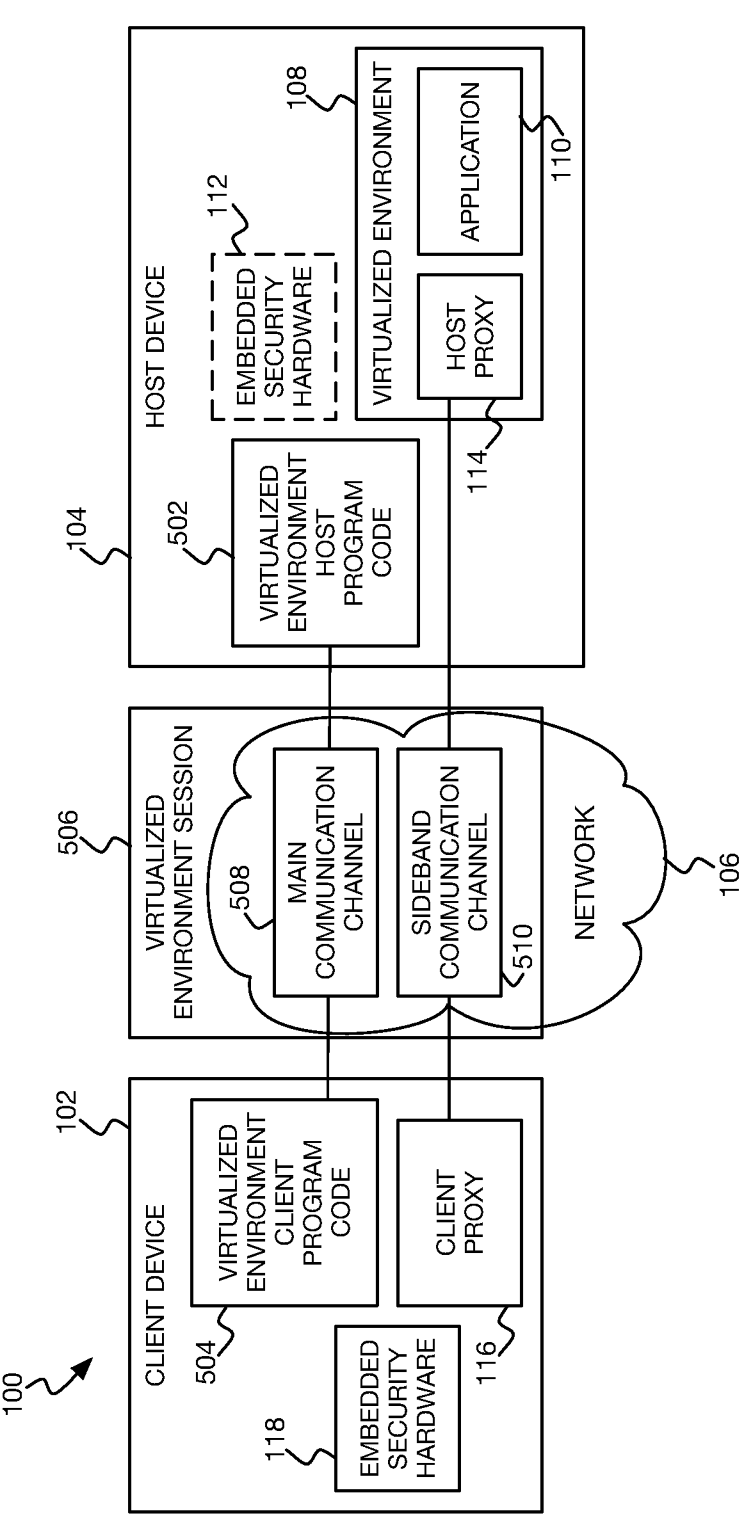
Figure 5C:
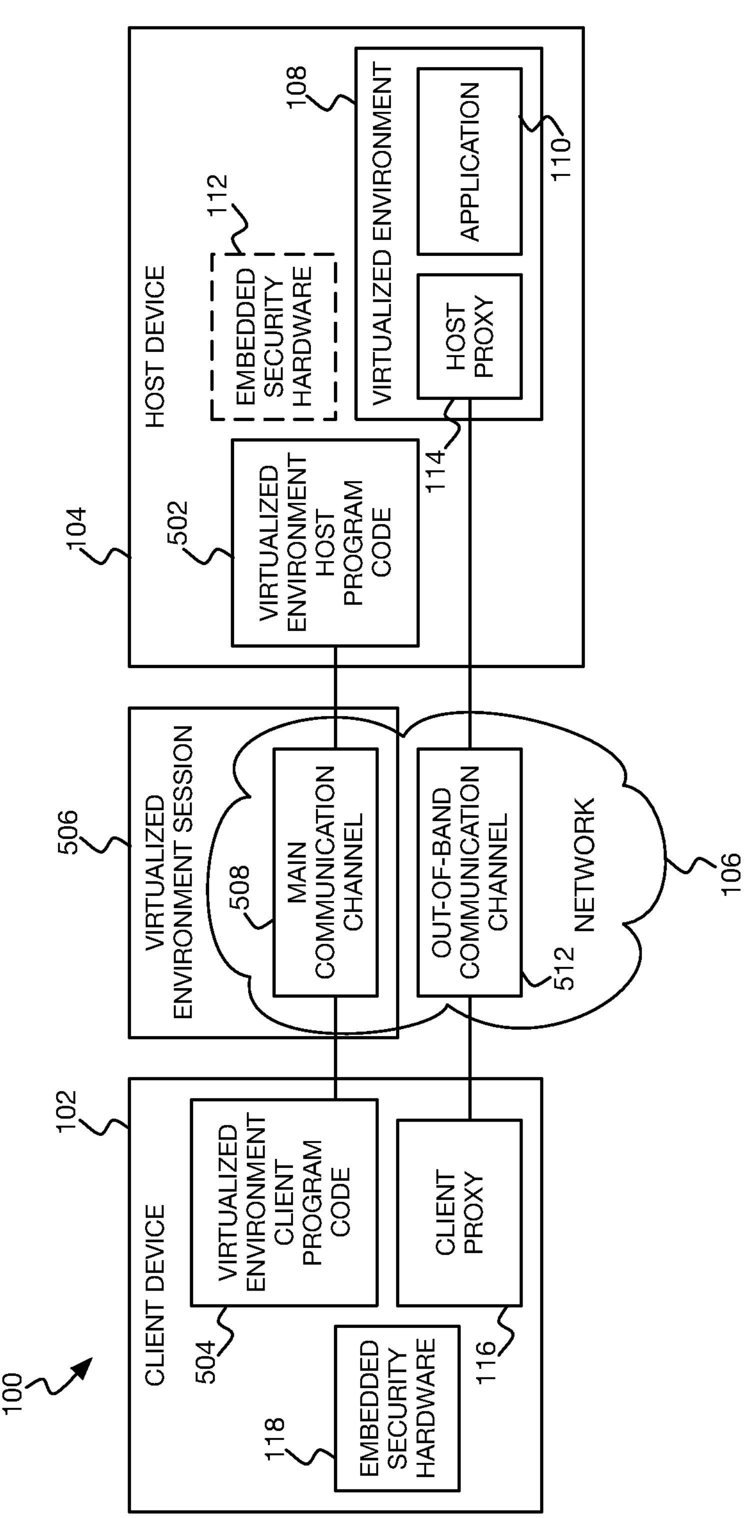

FIGS. 5A, 5B, and 5C show that the host proxy 114 and the client proxy 116 in the example proxy architecture 100 can communicate over different types of communication channels. In these figures, the host computing device 104 includes virtualized environment host program code 502 that provides the virtualized environment 108 including the host proxy 114 and the application 110. The host computing device 104 may or may not include embedded security hardware 112. The client computing device 102 includes virtualized environment client program code 504 that permits access of the virtualized environment 108 hosted by the host client computing device 104 at the computing device 102.

In each of the figures, the virtualized environment client program code 504 and the virtualized environment host program code 502 communicate with one another via the network 106 to establish a virtualized environment session 506 within which the client program code 504 accesses the virtualized environment 108 provided by the host program code 502. Specifically, the client program code 504 accesses the virtualized environment 108 within a main communication channel 508 of the virtualized environment session 506. The main communication channel 508 is the channel, in other words, over which a virtual machine, virtual desktop, or virtual service hosted at the host computing device 104 can be accessed at the client computing device 102.

In FIG. 5A, the client proxy 116 and the host proxy 114 also communicate with one another over the main communication channel 508 via the network 106. That is, embedded security hardware requests are sent from the host proxy 114 to the client proxy 116 over the same channel 508 that is used for access of the virtualized environment 108 at the client computing device 102. Similarly, embedded security hardware responses are sent from the client proxy 116 to the host proxy 114 over the same channel 508 that is used for access of the virtualized environment 108 at the client computing device.

In FIG. 5B, the client proxy 116 and the host proxy 114 instead communicate with one another via the network 106 over a sideband communication channel 510 that is part of the virtualized environment session 506. The virtualized environment server program code 502 and the virtualized environment client program code 504 may establish the sideband communication channel 510 when the virtualized environment session 506 is itself established. In another implementation, the server program code 502 and the client program code 504 may establish the sideband communication channel 510 on as-needed basis, when the host proxy 114 has to send a request to the client proxy 116 or the client proxy 116 has to send a response to the host proxy 114. Once the sideband communication channel 510 has been established, the channel 510 may remain for the lifetime of the virtualized environment session 506, or may be terminated after a certain time period of communication inactivity between the host proxy 114 and the client proxy 116.

In FIG. 5C, the client proxy 116 and the host proxy 114 instead communication with one another via the network 106 over an out-of-band communication channel 512 that is not part of the virtualized environment session 506. For example, the host proxy 114 and the client proxy 116 may communicate with one another directly, outside the auspices of the virtualized environment session 506. The out-of-band communication channel 512 may still be established by the virtualized environment client program code 504 and the virtualized environment server program code 502, or may instead be established by the client proxy 116 and the host proxy 114.

Figure 6:
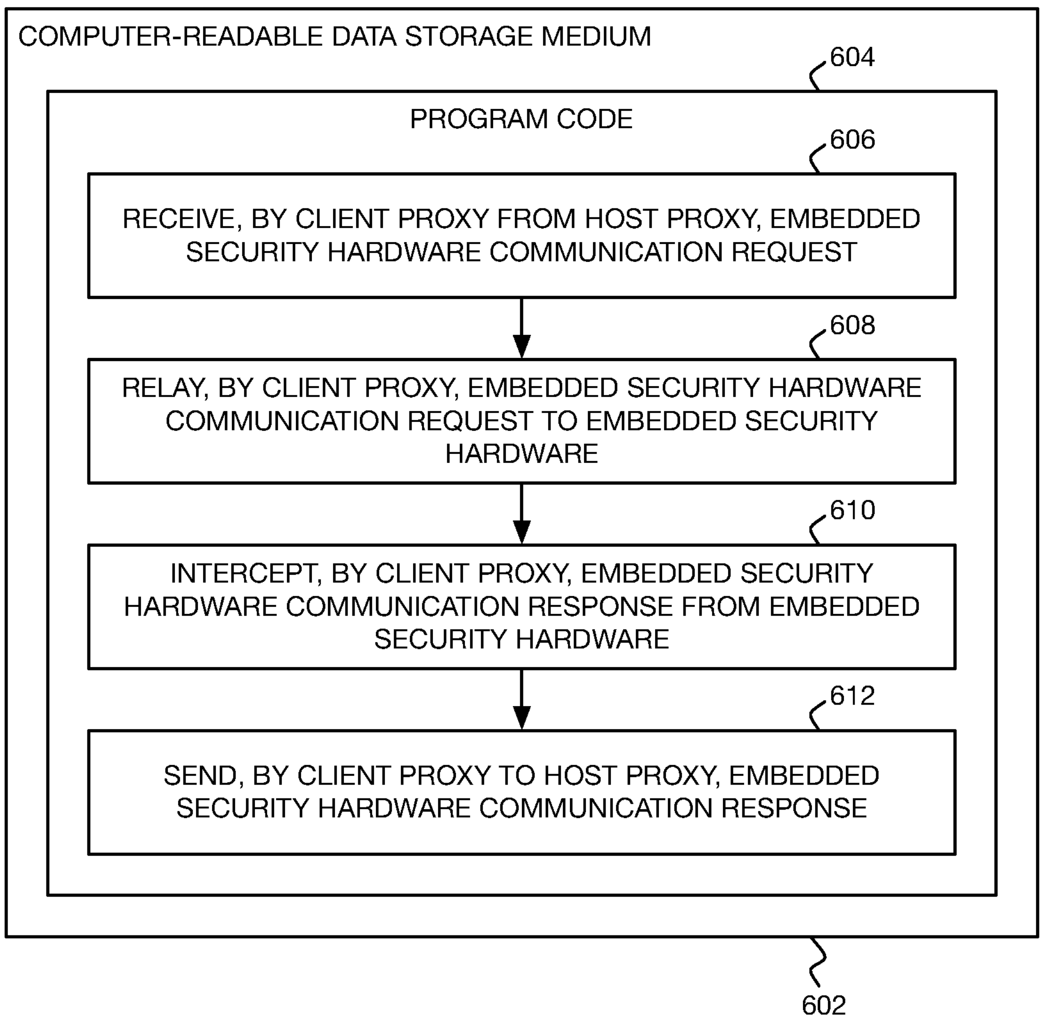
FIG. 6 is a diagram of an example non-transitory computer-readable data storage medium storing program code to implement a client proxy at a client computing device to leverage embedded security hardware of the client computing device within a virtualized environment hosted by a host computing device.

FIG. 6 shows an example non-transitory computer-readable data storage medium 602 storing program code 604 executable by a processor of the client computing device 102 to implement the client proxy 116 for performing client proxy processing. The client proxy processing includes receiving, from a host proxy 114 running (i.e., executed) within a virtualized environment 108, an embedded security hardware communication request sent by an application 110 running within the virtualized environment 108 (606). The virtualized environment is for the client computing device 102 and is hosted by the host computing device 104 with which the client computing device 102 is communicatively connected. The request is intended for embedded security hardware 112 of the host computing device 104, regardless of whether the host computing device 104 has or lacks such hardware 112, and is intercepted by the host proxy 114.

The client proxy processing includes relaying the embedded security hardware communication request to the embedded security hardware 118 of the client computing device 102 (608). The client proxy processing can include intercepting an embedded security hardware communication response returned by the embedded security hardware 118 of the client computing device 102 in reply to the embedded security hardware communication request and intended for the application 110 running within the virtualized environment 108 (610). The client proxy processing can include sending the embedded security hardware communication response to the host proxy 114 running within the virtualized environment 108 to relay to the application 110 running within the virtualized environment 108 (612).

Figure 7:
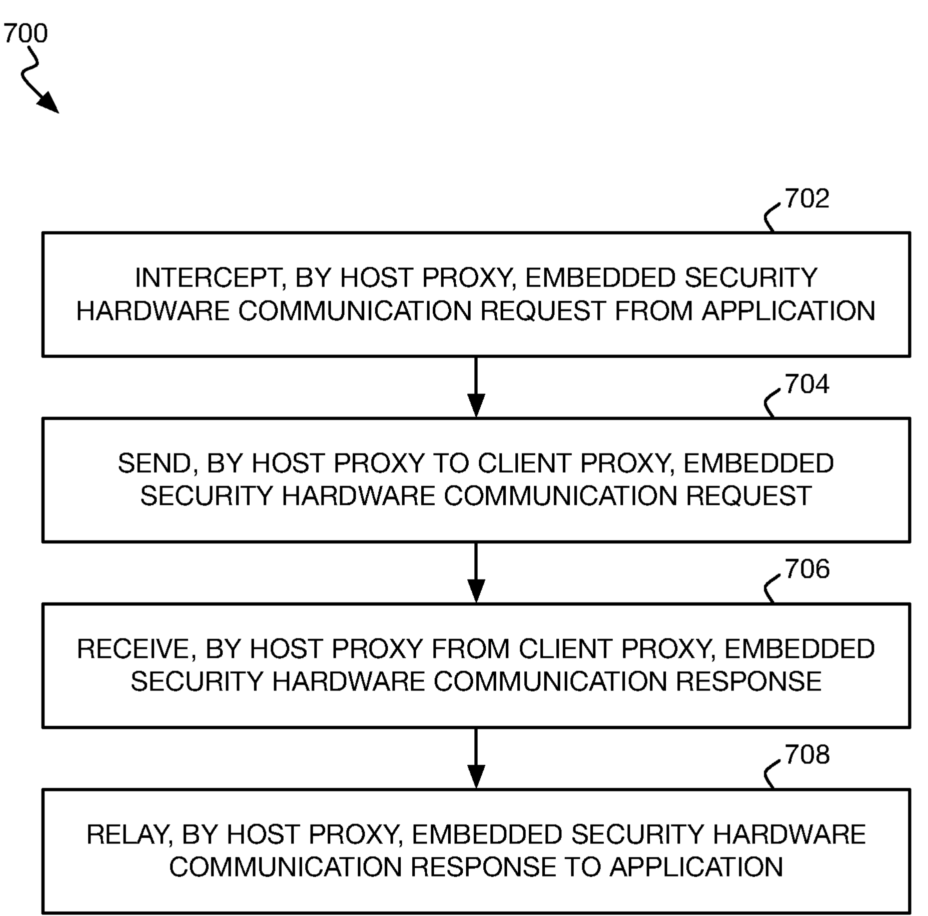
FIG. 7 is a flowchart of an example method performed by a host proxy of a host computing device hosting a virtualized environment to leverage embedded security hardware of a client computing device within the virtualized environment.

FIG. 7 shows an example method 700 performed by a host proxy 114 running within a virtualized environment 108 hosted by a host computing device 104 for a client computing device 102 with which the host computing device 104 is communicatively connected. The method 700 includes the host proxy 114 intercepting an embedded security hardware communication request sent by an application 110 running within the virtualized environment 108 and intended for embedded security hardware 112 of the host computing device 104 (702). The host computing device 104 may or may not actually include such embedded security hardware 112.

The method 700 includes the host proxy 114 sending the embedded security hardware communication request to a client proxy 116 running on the client computing device 102 to relay to embedded security hardware 118 of the client computing device 102 (704). The method 700 includes the host proxy 114 receiving, from the client proxy 116, an embedded hardware communication response returned by the embedded security hardware 118 of the client computing device 102 in reply to the embedded security hardware communication request, intended for the application 110 running within the virtualized environment 108, and intercepted by the client proxy 116 (706). The method 700 includes relaying the embedded security hardware communication response to the application 110 running within the virtualized environment 108 (708).

Figure 8:
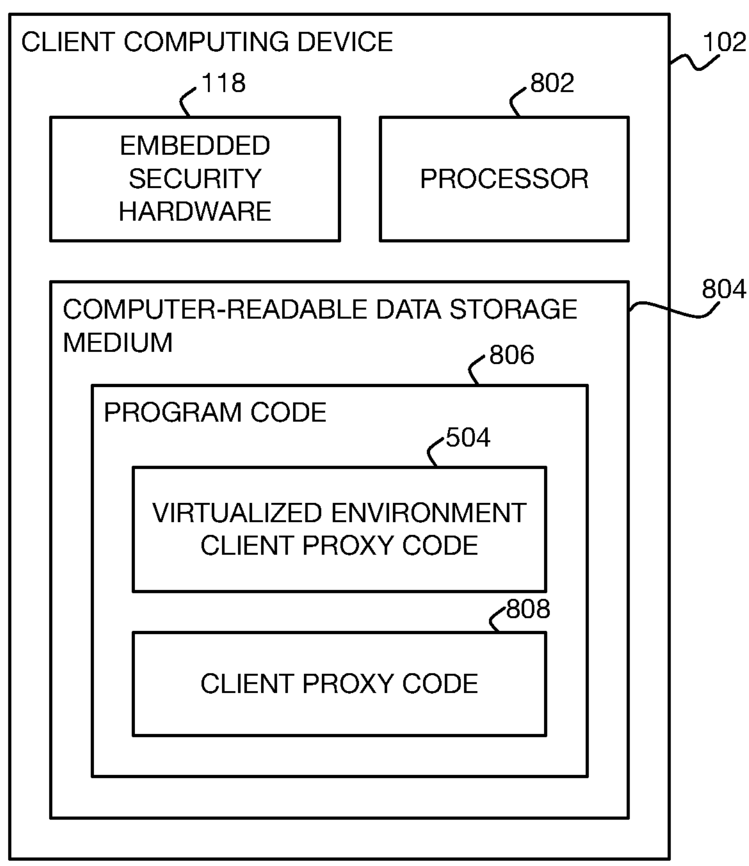
FIG. 8 is a block diagram of an example client computing device to leverage embedded security hardware of the client computing device within a virtualized environment hosted by a host computing device.

FIG. 8 shows a block diagram of an example client computing device 102. The client computing device 102 includes embedded security hardware 118, a processor 802, and a non-transitory computer-readable data storage medium 804 storing program code 806 executable by the processor 802. The client computing device 102 may include other components, in addition to or in lieu of those depicted.

The program code 806 includes virtualized environment client proxy code 504 to communicate with virtualized environment host program code 502 running on a host computing device 104 with which the client computing device 102 is communicatively connected to access a virtualized environment 108 for the client computing device 102 that is hosted by the host computing device 104.

The program code 806 further includes client proxy code 808. The client proxy code 808 is to receive, from a host proxy 114 running within the virtualized environment 108, an embedded security hardware communication request. The request is sent by an application 110 running within the virtualized environment 108, intended for embedded security hardware 112 of the host computing device 104 that may or may not exist, and intercepted by the host proxy 114. The client proxy code 808 is to relay the embedded security hardware communication request to the embedded security hardware 118 of the client computing device 102.

The client proxy code 808 can also be to intercept an embedded security hardware communication response returned by the embedded security hardware 118 of the client computing device 102 in reply to the embedded security hardware communication request. The response is intended for the application 110 running within the virtualized environment 108. The client proxy code 808 can thus be to send the embedded security hardware communication response to the host proxy 114 running within the virtualized environment 108 to relay to the application 110 also running within the virtualized environment 108.

Techniques have been described herein that leverage a computing device's embedded security hardware within a virtualized environment hosted by a host computing device. The techniques provide for a proxy architecture in this respect, including a client proxy at the client computing device and a host proxy at the host computing device. The client proxy and the host proxy together permit the embedded security hardware of the client computing device to be used within the virtualized environment as if the embedded security hardware were part of the host computing device.

We claim:

1. A non-transitory computer-readable data storage medium storing program code executable by a processor of a client computing device having embedded security hardware to implement a client proxy for performing client proxy processing comprising:

receiving an embedded security hardware communication request from a host proxy of a host computing device, the host computing device to execute the host proxy within a virtualized environment for the client computing device and to host the virtualized environment with which the client computing device is communicatively connected to, wherein an application is to send the embedded security hardware communication request, the host computing device to execute the application within the virtualized environment, wherein the embedded security hardware communication request is intended for embedded security hardware of the host computing device, and wherein the host proxy is to intercept the embedded security hardware communication request; and relaying the embedded security hardware communication request to the embedded security hardware of the client computing device, wherein the embedded security hardware of the client computing device is to respond to the embedded security hardware communication request.

2. The non-transitory computer-readable data storage medium of claim 1, wherein the client proxy processing further comprises:

intercepting an embedded security hardware communication response returned by the embedded security hardware of the client computing device in reply to the embedded security hardware communication request, wherein the embedded security hardware communication response is intended for the application; and sending the embedded security hardware communication response to the host proxy, the host proxy to relay the embedded security hardware communication response to the application.

3. The non-transitory computer-readable data storage medium of claim 1, wherein the client proxy processing together with the host proxy permits the embedded security hardware of the client computing device to be used within the virtualized environment hostable by the host computing device as if the embedded security hardware of the client computing device were part of the host computing device.

4. The non-transitory computer-readable data storage medium of claim 1, wherein the application sends the embedded security hardware communication request to a host embedded security hardware software stack, the host computing system to execute the host embedded security hardware software stack within the virtualized environment, and wherein the host proxy intercepts the embedded security hardware communication request after the host embedded security hardware software stack relays the embedded security hardware communication request, the host proxy positioned below the host embedded security hardware software stack, and wherein the client proxy processing relays the embedded security hardware communication request to a client embedded security software stack, the client computing device to execute the client embedded security software stack, the client proxy positioned above the client embedded security hardware software stack.

5. The non-transitory computer-readable data storage medium of claim 1, wherein the host proxy is a first host proxy, the virtualized environment is a first virtualized environment, the host computing device is a first host computing device, the embedded security hardware communication request is a first embedded security hardware communication request, and the application is a first application, the client proxy processing further comprising:

receiving, from a second host proxy of a second host computing device, the second host computing device to execute the second host proxy within a second virtualized environment for the client computing device different than the first virtualized environment and to host the second virtualized environment with which the client computing device is communicatively communicable, a second embedded security hardware communication request, wherein a second application is to send the second embedded security hardware communication request, the second host computing device to execute the second application within the second virtualized environment, wherein the second embedded security hardware communication request is intended for embedded security hardware of the second host computing device, and wherein the second host proxy is to intercept the second embedded security hardware communication request; and relaying the second embedded security hardware communication to the embedded security hardware of the client computing device.

6. The non-transitory computer-readable data storage medium of claim 5, wherein the second host computing device is a same computing device as or a different computing device than the first host computing device.

7. The non-transitory computer-readable data storage medium of claim 1, wherein the virtualized environment comprises a virtual machine, a virtual desktop, a virtualized application, or a virtual service.

8. The non-transitory computer-readable data storage medium of claim 1, wherein the virtualized environment is provided at the host computing device by virtualized environment host program code, the host computing device to execute the virtualized environment host program code, and wherein the client computing device is to access the virtualized environment by executing virtualized environment client program code on the client computing device, and wherein the client proxy and the host proxy communicate over at least one of:

a main communication channel over which the virtualized environment client program code accesses the virtualized environment provided by the virtualized environment host program code within a virtualized environment session;

a sideband communication channel established by the virtualized environment client program code and the virtualized environment host program code as part of the virtualized environment session; or an out-of-band communication channel that is not part of the virtualized environment session.

9. A client computing device comprising:

embedded security hardware;

a processor; and a non-transitory computer-readable data storage medium storing program code executable by the processor, the program code comprising:

virtualized environment client program code that, when executed, causes the processor to communicate with virtualized environment host program code of a host computing device with which the client computing device is communicatively connectable to access a virtualized environment for the client computing device, the host computing device is to host the virtualized environment;

client proxy code that, when executed, causes the processor to:

receive an embedded security hardware communication request from a host proxy of the host computing device, the host computing device to execute the host proxy within the virtualized environment, wherein an application within the virtualized environment is to send the embedded security hardware communication request, wherein the embedded security hardware communication request is intended for embedded security hardware of the host computing device, and wherein the host proxy is to intercept the embedded security hardware communication request; and relay the embedded security hardware communication request to the embedded security hardware of the client computing device, wherein the embedded security hardware of the client computing device is to respond to the embedded security hardware communication request.

10. The client computing device of claim 9, wherein the client proxy code is further to:

intercept an embedded security hardware communication response returned by the embedded security hardware of the client computing device in reply to the embedded security hardware communication request, wherein the embedded security hardware communication response is intended for the application; and send the embedded security hardware communication response to the host proxy, the host proxy to relay the embedded security hardware communication response to the application.

11. The client computing device of claim 9, wherein the client computing device is an Internet-of-Things (IoT) device, a laptop or desktop computing device, a smartphone, or a tablet computing device.

12. The client computing device of claim 9, wherein the embedded security hardware is a Trusted Platform Module (TPM), a firmware TPM, or a T2 chip.

13. A method comprising:

intercepting an embedded security hardware communication request by a host proxy of a host computing device, the host computing device to execute the host proxy within a virtualized environment and to host the virtualized environment for a client computing device with which the host computing device is communicatively connected to, wherein an application is to send the embedded security hardware communication request, the host computing device to execute the application within the virtualized environment, and wherein the embedded security hardware communication request is intended for embedded security hardware of the host computing device; and sending, with the host proxy, the embedded security hardware communication request to a client proxy of the client computing device, the client computing device to execute the client proxy, the client proxy to relay the embedded security hardware communication request to embedded security hardware of the client computing device, wherein the embedded security hardware of the client computing device is to respond to the embedded security hardware communication request.

14. The method of claim 13, further comprising:

receiving, by the host proxy from the client proxy, an embedded hardware communication response returned by the embedded security hardware of the client computing device in reply to the embedded security hardware communication request, wherein the embedded hardware communication response is intended for the application, and wherein the client proxy is to intercept the embedded hardware communication response; and relaying the embedded security hardware communication response to the application.

15. The method of claim 13, wherein the host computing device lacks the embedded security hardware for which the embedded security hardware communication request sent by the application is intended.

* * * * *